United States Patent [19]
Wu

[11] Patent Number: 5,814,903
[45] Date of Patent: Sep. 29, 1998

[54] PROGRAMMABLE GAIN FOR SWITCHED POWER CONTROL

[75] Inventor: Keng Chih Wu, North Brunswick, N.J.

[73] Assignee: Lockheed Martin Corporation, East Windsor, N.J.

[21] Appl. No.: 713,621

[22] Filed: Sep. 13, 1996

[51] Int. Cl.[6] ....................................................... H02J 3/08
[52] U.S. Cl. ........................... 307/125; 307/44; 307/52; 307/60; 307/80; 323/906; 244/173
[58] Field of Search .............................. 307/125, 43, 52, 307/60, 80, 81, 64, 66, 141, 44; 323/906, 265, 280, 284; 244/173

[56] References Cited

U.S. PATENT DOCUMENTS

| | | | |
|---|---|---|---|
| 3,816,804 | 6/1974 | Cardwell .................................... | 307/66 |
| 4,575,679 | 3/1986 | Chung et al. ............................ | 323/906 |
| 4,691,159 | 9/1987 | Ahrens et al. ............................ | 323/906 |
| 4,794,272 | 12/1988 | Bavaro et al. ............................. | 307/66 |
| 5,602,464 | 2/1997 | Linkowsky et al. ...................... | 323/271 |

OTHER PUBLICATIONS

"Loop Gain of a Spacecraft Switched Shunt Power System", IEEE Aerospace and Electronic Systems, vol. 30, No. 4, Oct. 1994, pp. 1049–1053.

Primary Examiner—William M. Shoop, Jr.
Assistant Examiner—Albert W. Paladini
Attorney, Agent, or Firm—W. H. Meise; C. A. Berard

[57] ABSTRACT

In the described embodiments, a spacecraft is powered by paralleled solar panels, which supply power to a load. The panels are ORed together, and each is controlled by a switched shunt, which provides coarse control of the load voltage. A control loop senses the load voltage, and logic selects those shunts which are conductive at any particular time in a manner which tends to maintain the load voltage constant. The control loop may undesirably become unstable because of gain changes caused by changes in solar panel insolation. A further controller adjusts the clock frequency at which the shunts are switched in a manner which tends to stabilize the loop. The further controller responds (a) to the current of one or more of the panels, (b) to the frequency of oscillations across the load, or (c) to both.

11 Claims, 10 Drawing Sheets

PROGRAMMABLE GAIN FOR SWITCHED POWER CONTROL

FIELD OF THE INVENTION

This invention relates to switched power controllers, and more particularly to such power controllers which are operated in parallel for increased power-handling capability, and which are especially adapted for stabilizing switched-shunt control of spacecraft solar panels when used for load voltage control.

BACKGROUND OF THE INVENTION

Figure 1:
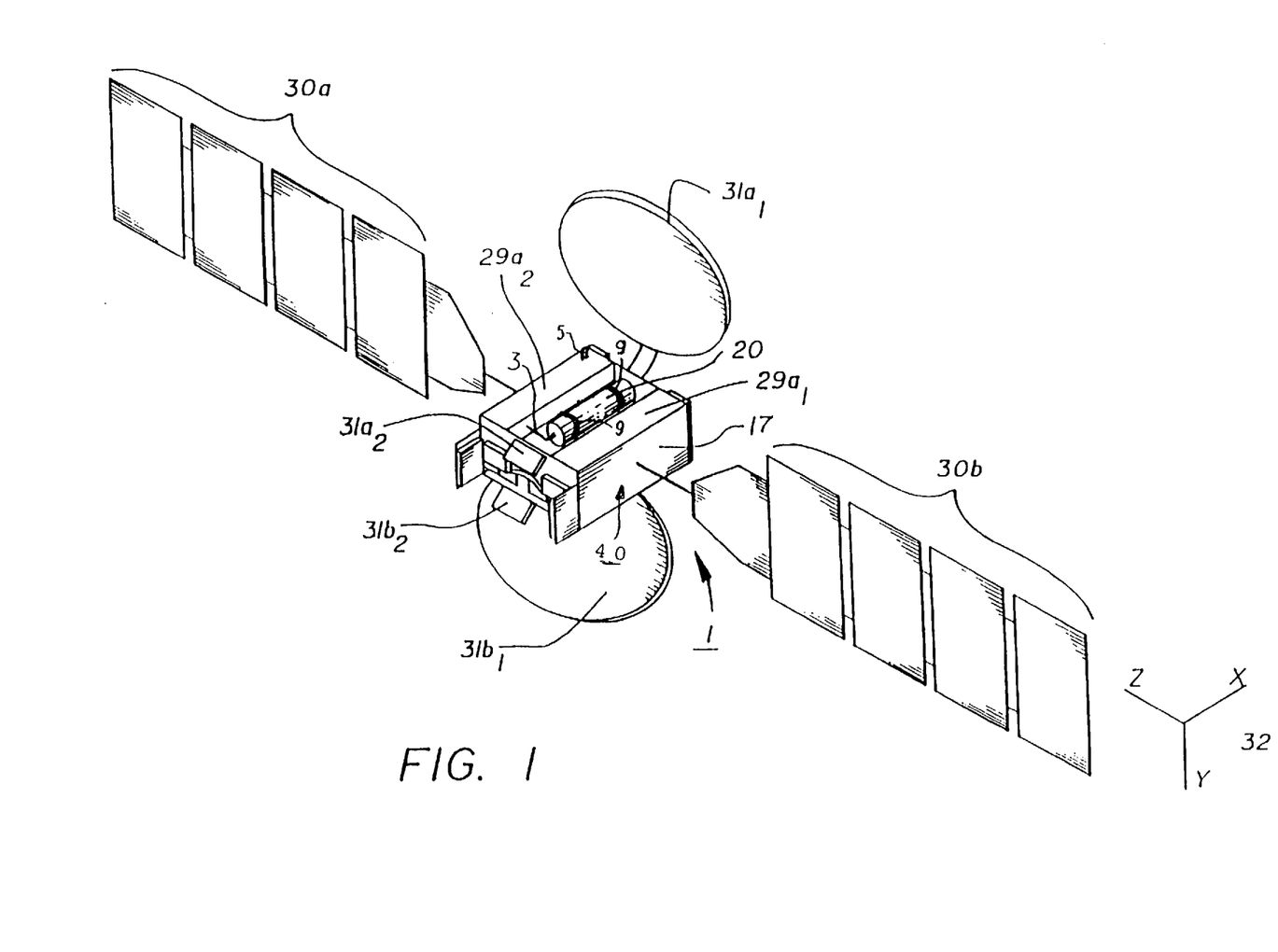
FIG. 1 is a simplified view of a spacecraft having solar panels with which a system according to the invention may be used.

FIG. 1 illustrates a spacecraft powered by solar panels. In FIG. 1, a spacecraft designated generally as 10 includes unfurled four-section solar panels designated 30a and 30b, a body designated generally as 1, including access panels 29a1 and 29a2, and a propellant tank 20 held in place by straps 9, all oriented relative to orthogonal X,Y, and Z axes designated as 32. Spacecraft 10 also includes a plurality of engines or thrusters, one of which is illustrated as 5, which is connected to propellant tanks, including tank 20, by plumbing illustrated as 3. Spacecraft 10 also includes a payload in the form of a communication system designated generally as 40, the active electrical portions of which are mounted behind panel 17. Communication system 40 also includes a first antenna system including dual-polarization reflector 31a1 and its feed 31b1, and a second system antenna reflector 31b1 and its feed 31b2.

Figure 2:
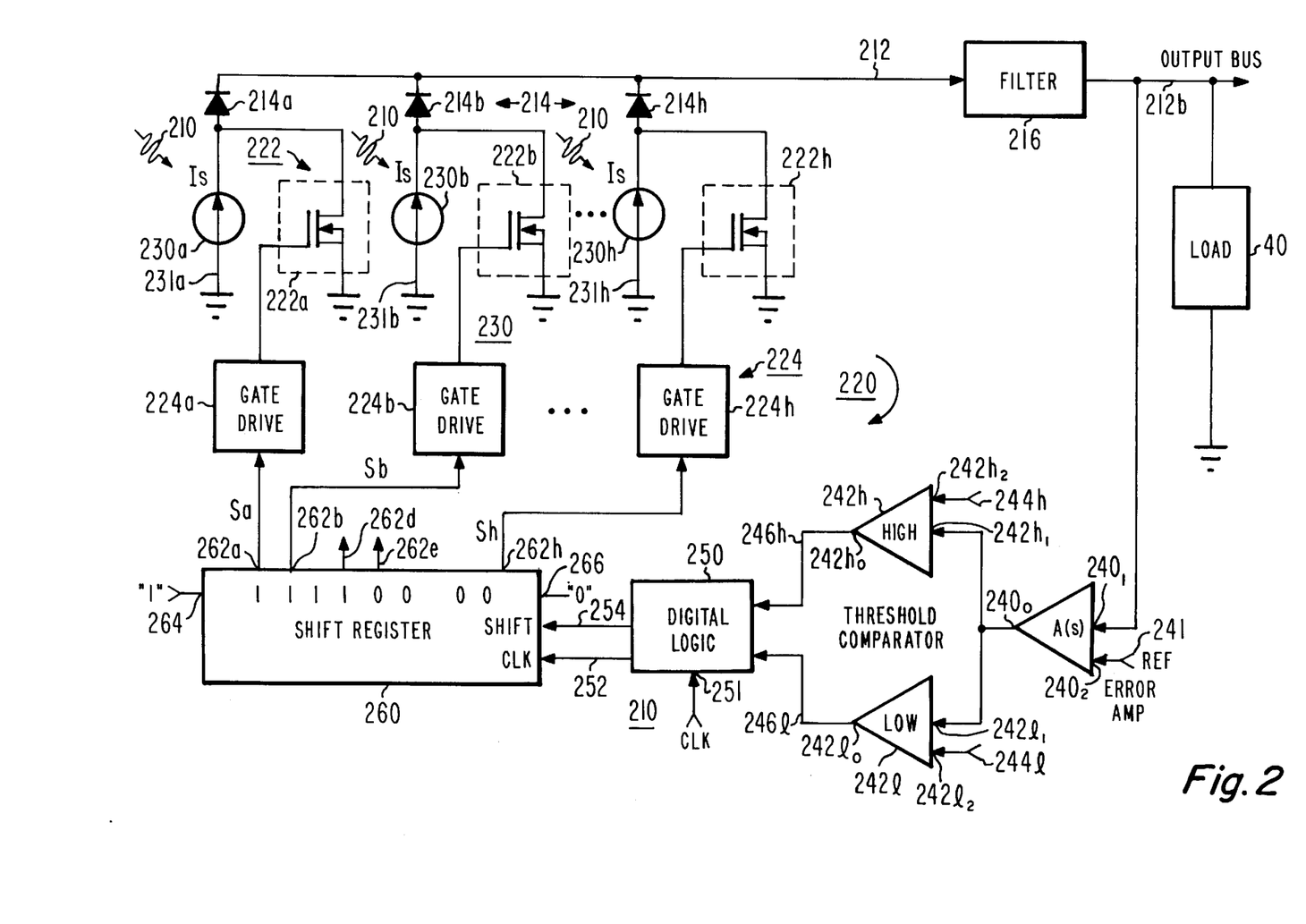
FIG. 2 is a simplified diagram, in block and schematic form, of a prior-art clocked switched shunt voltage control system for tending to control a bus voltage in the spacecraft of FIG. 1.

FIG. 2 illustrates a prior-art switched-shunt control system which may be used to control the energizing voltage applied to the electrical load consisting of the electrical components of the communication system 40 of FIG. 1. In FIG. 2, the individual solar panels of arrays 30a and 30b of FIG. 1 are each represented by a current-source (arrow-in-circle) symbol. Thus, in FIG. 2, current-source symbols 230a, 230b, . . . , 230h represent the solar panels of solar panel arrays 30a and 30b of FIG. 1. Each solar panel 230a, 230b, . . . , 230h of solar panel array 230 of FIG. 2, when insolated by sunlight illustrated by photon symbols 210, tends to produce electric current, designated by the symbol Is. One end of each solar panel 230a, 230b, . . . , 230h is connected to a reference conductor, illustrated by a ground symbol. For the illustrated direction of conventional current flow illustrated by arrows, the negative ends or electrodes 231a, 231b, . . . , 231h of the solar panels are grounded. The other (positive polarity) ends or electrodes 232a, 232b, . . . , 232h of solar panels 230a, 230b, . . . , 230h, respectively, are coupled to a bus 212 by a diode OR circuit designated generally as 214, which includes unidirectional current conducting elements such as diodes 214a, 214b, . . . , 214h., each having its anode connected to the positive electrode of its associated solar panel, and its cathode connected to bus 212. For example, diode 214a has its anode connected to the positive electrode of solar panel 230a and its cathode connected to bus 212, diode 214b has its anode connected to the positive electrode of solar panel 230b and its cathode connected to bus 212, and diode 214h has its anode connected to the positive electrode of solar panel 230h and its cathode connected to bus 212. As is known to those skilled in the art, those solar panels of array 230, which, as a result of insolation 210 produce a voltage greater (by the diode offset voltage) than that voltage currently existing on bus 212, can supply current to the bus. The current supplied to the bus 212 from solar panels 230 is filtered by an integrating filter illustrated as 216 to generate the bus voltage. The filtered bus voltage is applied to an output bus 212b to supply energizing voltage to the spacecraft generally and particularly to the load represented by the communication system 40.

In order to operate the spacecraft communication system continuously, the electrical load 40 which represents the electrical system must be continuously supplied with energization at a selected voltage. The solar panels must be initially dimensioned so that, under the worst case of solar insolation (least insolation), combined with the worst case of inefficiency attributable to age-related degradation and micrometeorite damage, the desired bus voltage can be maintained. This requirement, in turn, establishes the dimensions of the solar arrays such that, under nominal conditions, they produce, in combination, much more electrical energy than is required by the spacecraft as a whole.

The arrangement of FIG. 2 includes a control system or control loop designated generally as 220, which senses the voltage on output bus 212b, and which operates an array 222 of switch-controllable shunts associated with the array 230 of solar panels. More particularly, each solar panel is associated with its own shunt, as, for example, solar panel 230a is associated with a shunt 222a, solar panel 230b is associated with a shunt 222b, . . . , and solar panel 230h is associated with a shunt 222h. The shunts 222 are illustrated as being switching field-effect transistors (FETs), each having a fully conductive or ON state, and a fully nonconductive or OFF state, which states are selected by a gate control signal applied over a control signal path from an associated gate drive circuit 224. Thus, the ON or OFF state of shunt 222a is controlled by gate signal from a gate drive circuit 224a, the state of shunt 222b is controlled by gate drive circuit 224b, and the state of shunt 222h is controlled by signal from gate drive circuit 224h. In the OFF or nonconductive state, a shunt does not affect the coupling of its associated solar panel to bus 212. In the ON state, each shunt effectively short-circuits its associated solar panel, with the effect that the solar panel current flows through the relatively low resistance of the ON-state shunt, so that the solar panel voltage is lower than the bus voltage, whereby the OR coupling array 214 decouples that particular solar panel from the bus 212. When a solar panel is decoupled from bus 212, it contributes no current to the bus which can be integrated by filter 216, and the bus voltage tends to decrease. Thus, switching ON the shunt of a particular solar panel, such as shunt 222a of solar panel 230a, decouples that solar panel 230a from bus 212, and thereby tends to reduce the bus voltage. Consequently, the bus voltage can be controlled by selective control of the ON or OFF state of the various shunts 222 of the system. It should be noted that the switching of shunts provides a relatively coarse control of the bus voltage, and the control is often supplemented or improved by a linear controller (not illustrated). Such a linear controller might include a series-pass linear regulator, or linear-shunt (as opposed to switched-shunt) control of one or more of the solar panels. The coarse control provided by switching of shunts, when used in conjunction with a linear controller, desirably avoids the need for the linear regulator to dissipate the full power generated by the solar panels.

Controller loop 220 of FIG. 2 includes an error amplifier 240 having a first input port $240_1$ coupled for sensing the voltage at output bus 212b, and a second input port $240_2$ coupled to a reference (ref) voltage 241, for generating error signals or voltages at its output port 240o. The error signals at output port 240o represent the amount of deviation of the voltage of the output bus 212b from the desired output voltage, and the direction of the deviation. Thus, if the bus voltage tends to rise above the set-point voltage established by reference 241, the error signal at the output port of error amplifier 240 tends to drift to a more positive value (assuming that error amplifier 240 is noninverting), while if the bus voltage tends to fall below the set-point, the error signal tends to drift to a less positive value, or to a negative value. Those skilled in the art know that degenerative control loops such as loop 220 tend to minimize the magnitude of the error voltage at the output of error amplifier 240, and that the magnitude of the error signal is related to the loop gain of the control loop as well as to the deviation of the controlled parameter, the bus voltage. The error signal is applied from the output port 240o of error amplifier 240 to first input ports $242h_1$ and $242l_1$ of a pair of threshold comparators 242h (high) and 242l (low), respectively, each of which compares the error voltage with a particular reference voltage. Comparator 242h compares the error voltage at its input port $242h_1$ with a relatively "high" reference voltage 244h which is applied to an input port $242h_2$, while comparator 242l compares the error signal at its input port $242l_1$ with a negative or "low" reference voltage at port 244l. When the error signal drifts more positive by an amount sufficient to trigger comparator 242h, a single-bit (high/low) control signal at the output port 242ho of comparator 242h changes state, while if the error signal drifts less positive by a corresponding amount, comparator 242l produces a state change of a single-bit control signal at its output port 242lo. There is a "dead-band" between the high and low threshold values, in which no change of state of either control signal takes place. Consequently, so long as the bus voltage remains sufficiently near the set value, the error voltage will remain within the dead-band, the output signals from comparator 242h remains in the OFF or logic low state, and the output signals from comparator 242l remain in the OFF or logic low state. If the voltage at output bus 212b drifts too far positive, the error signal at port 240o also drifts in a positive direction to a value above the dead-band, and comparator 242h switches state to an ON or logic high state, and, if the bus voltage drifts too far below the set value, the error voltage drifts in a less positive direction to a value below the deadband to trigger comparator 242l from a logic low state to a logic high state. Thus, deviation of the bus voltage from the set value by a particular amount in the positive direction changes the output state of comparator 242h, and a similar deviation in the negative direction changes the state of comparator 242l. Thus, so long as the bus output voltage is maintained near the setpoint, whether by control of the load current, by a linear regulator (not illustrated), or in some other manner, neither comparator 242h nor 242l produces at its output port an output signal which is indicative of bus voltage deviation.

As further illustrated in FIG. 2, the output ports 242ho and 242lo are coupled by signal paths 246h and 246l, respectively, to a logic circuit illustrated as 250, which also receives master clock signals over a path 251. Digital logic circuit 250 processes its input signals received from paths 246h and 246l so that, when its inputs from comparators 242h and 242l indicate that the bus voltage lies sufficiently near the set value, a clock (clk) signal is blocked from proceeding over path 252 to the clock (clk) input port of a bidirectional shift register 260, but when either comparator 242h or 242l indicates that the maximum bus voltage deviation has been exceeded, allows the clock signal to proceed through block 250 and over path 252 to the clock input port of shift register 260. Thus, when the bus voltage is sufficiently close to the set value, no clock signals are applied to bidirectional shift register 260, and its output signals Sa, Sb, . . . , Sh remain unchanged at its output ports 262a, 262b, . . . , 262h.

Bidirectional shift register 260 has a hard-wired logic "1" signal applied to a first end 264 and a logic "0" applied to its other end 266. Output signals Sa, Sb, . . . , Sh are simultaneously available from output ports 262a, 262b, . . . , 262h of shift register 260 of FIG. 2. Depending upon the direction and amount of clocking, the output signals Sa, Sb, . . . , Sh may be all-ones or all-zeroes, or any pattern of ones on the left and zeroes on the right, such as the pattern illustrated pattern 11110000. The logic state of each of signals Sa, Sb, . . . , Sh controls the state of the associated gate drive circuit 224a, 224b, . . . , 224h, and the corresponding shunt 222a, 222b, . . . , 222h. Thus, a high or logic 1 state of output signal Sa of shift register 260 represents an ON state of shunt 222a, which corresponds to an OFF state of the associated solar panel 230a, i.e. a state in which the solar panel does not apply current through diode 214a to bus 212. In the same manner, a logic 1 state of output signal Sb of shift register 260 represents an ON condition of the associated shunt 222b, and an OFF state of solar panel 230b; and a logic 0 state of output signal Sh of shift register 260 represents an OFF condition of the associated shunt 222h, and an ON state (current supplied through diode 214h to bus 212) of the corresponding solar panel 230h. Thus, the logic 1 and logic 0 states of the output signals S of shift register 260 directly correspond to the OFF or ON states, respectively, of the corresponding solar panel. As illustrated in FIG. 2, the output signal states of register 260 are 11110000, so that solar panels "e" through "h" (only solar panel "h" of which is illustrated) are coupled to the bus as suggested by the logic 0 state of output ports 262e through 262h, and solar panels "a" through "d" (not illustrated) are shunted, and are therefore not electrically coupled to the bus, as suggested by the logic 1 state of output ports 262a through 262d.

Control loop 220 of FIG. 2 controls the bus voltage by shifting the pattern of logic 1 and logic 0 produced at the output ports 262a–262h (where the hyphen represents the word "through") of shift register 260. Thus, if the bus voltage were to tend to rise, which might happen, for example, due to increased insolation, control loop 220 changes the pattern of output signals Sa–Sh of shift register 260 from the illustrated pattern 11110000 to, for example, 11111000. This change, in turn, reduces from four to three the number of solar panels contributing to the bus voltage, and increases from four to five the number of solar panels which are shunted and therefore "inactive." Further increases in bus voltage would be met by successively changing the pattern of Sa–Sh to 11111100 (two active panels) and then 11111110 (one active panel). Presumably, some power would be required under all conditions, so the pattern 11111110 might represent the limit of the control range. If it were anticipated that the spacecraft might be effectively shut down for some reason, and operation on battery power were desired under that condition, the pattern 11111111 might be allowable, representing inactivation of all the solar panels. Conversely, if the bus voltage should tend to sag or decrease, as might happen, for example, if the load current were to increase, control loop 220 changes the pattern of output signals on output ports 262a–262h from the pattern 11110000 illustrated in FIG. 2 to 11100000, thus increasing the number of "active" solar panels from four to five, thereby tending to restore the bus voltage. Further decreases in bus voltage would result in successive selection of a pattern of signals Sa–Sh of 11000000 (six active panels), 10000000 (seven active panels), and 00000000. The pattern 00000000 indicates that all the solar panels are "active," or in use, and represents the limit of control.

Referring once again to FIG. 2, digital logic block 250 applies clock signals to the clock signal input port of shift register 260 over a signal path 252 only when the bus voltage has an excessive deviation from the set value, thereby requiring a change in the distribution of the logic 1 and logic 0 states at the output of shift register 260. When a clock signal is applied to the clk input port of register 260, the registers shift their signals in the direction established by the "shift" signal applied to the shift input port. In the example of FIG. 2, a logic high shift signal on path 254 represents too high a bus voltage, and consequently represents a "right" shift of the signals in the register for degenerative control, whereupon the left-most logic 1 is shifted into the register, and a logic 0 leaves from the right (in response to one clock signal). Similarly, a logic low "shift" signal on path 254, in conjunction with a clock signal applied by way of path 252, represents a low bus voltage, which requires a "left" shift of the signals in the register, whereupon the right-most logic 0 is shifted into the register, and a logic 1 leaves from the left. This provides the desired control direction and stepwise control.

Figure 3:
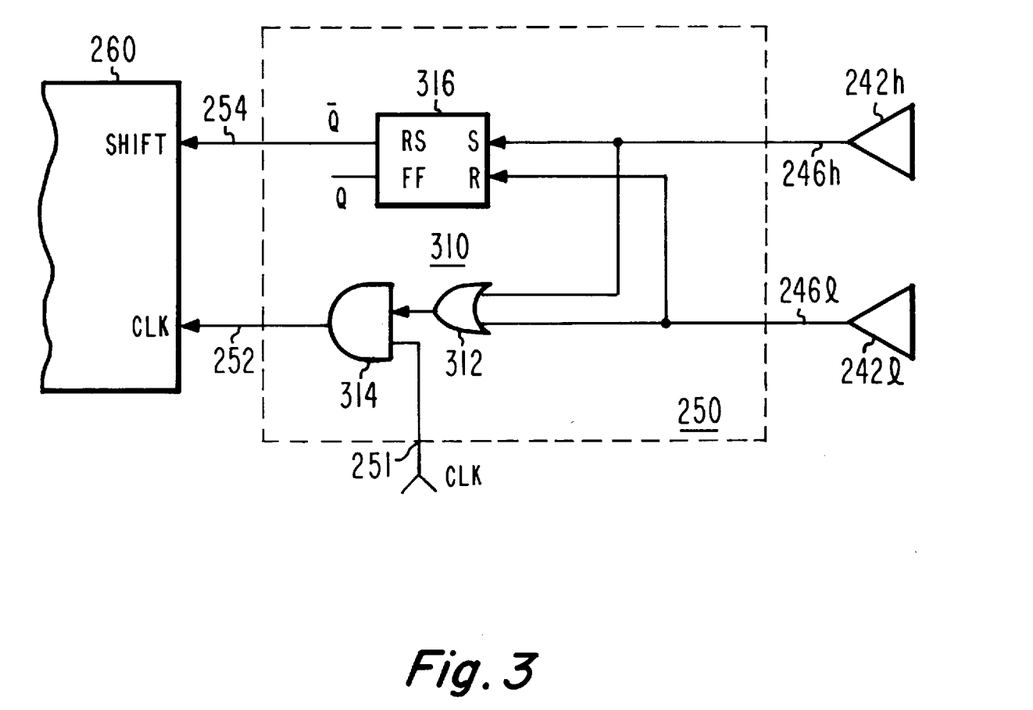
FIG. 3 is a simplified block diagram of a combinatorial logic circuit which may be used in a portion of the arrangement of FIG. 2.

FIG. 3 is a simplified block diagram of logic circuit 250 of FIG. 2. FIG. 3 is a simple combinatorial logic circuit which includes a gate 310 for gating clock signals from input port 251 to clock output port 252. Gate 310 includes an OR gate 312 having its input ports coupled to signal paths 246$h$ and 246$l$, so that a logic 1 level on either path generates a logic 1 at a first input port of an AND gate 314. Thus, AND 314 is enabled for passing clock signals applied to its second input port only when one of high or low comparators 242$h$ or 242$l$ indicates an excursion outside of the dead-zone. Exceeding the dead-zone value, therefore, causes clock signals to be applied to shift register 260 of FIG. 2, thereby causing it to shift. The direction of shift is established by an RS flip-flop (FF) 316, which has its $\overline{Q}$ output is coupled to the shift input of shift register 260, and its R and S input ports coupled to the outputs of threshold comparators 242$h$ and 242$l$, respectively. FF 316 couples a logic high or logic low level to the shift input port of shift register 260 depending upon which of the threshold comparators has the logic high output level.

Figure 4A:
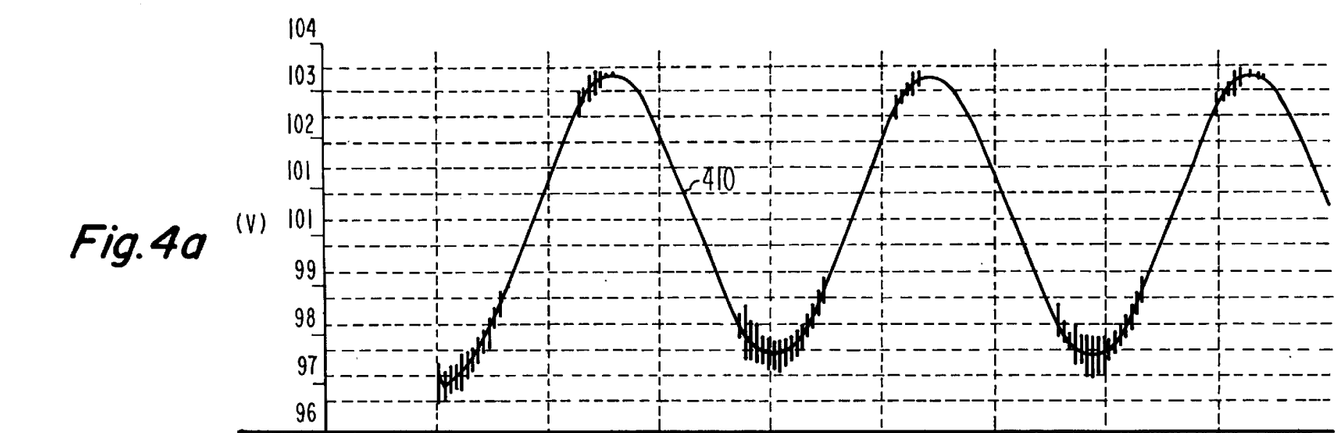
FIG. 4a is an amplitude-time plot of oscillatory perturbations which may occur as a result of transient condition during low solar insolation operation of an arrangement similar to that of FIG. 2.
Figure 4B:
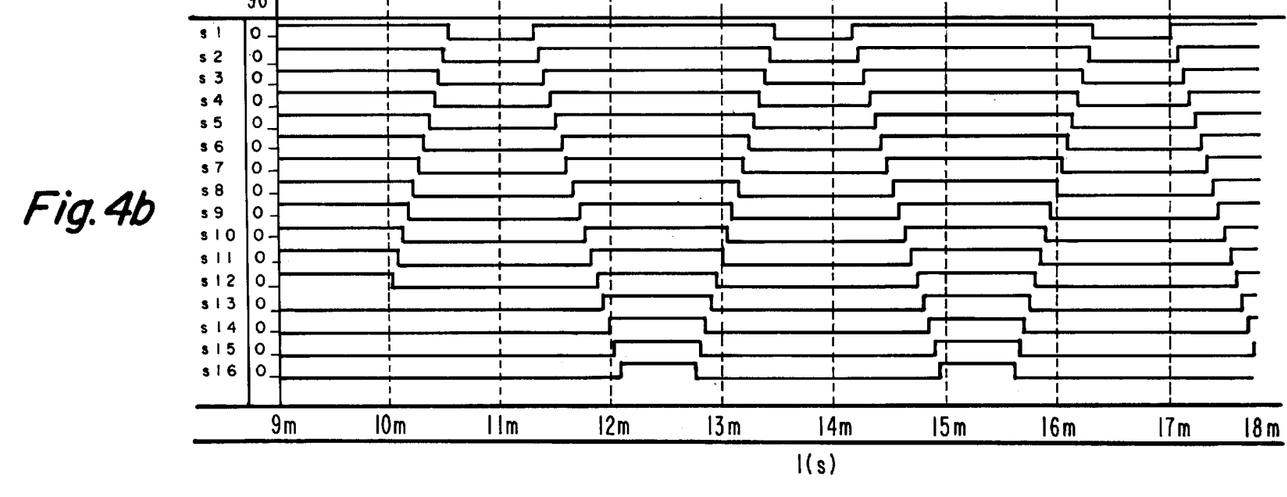
FIG. 4b illustrates the logic states, as a function of time, of current source shunts associated with the solar panels.

It has been discovered that a system such as that of FIG. 2 may occasionally suffer from instability, in that the bus voltage tends to vary cyclically or in an oscillatory manner. This is undesirable, as it increases the stress on the various electrical loads energized therefrom, and in the case of communications equipment, may tend to modulate the signals being processed with the oscillations or perturbations of the bus voltage. FIG. 4a includes a computer plot 410 which illustrates the effect of instability on a system modeling that described in relation to FIG. 2, but having sixteen current sources or solar panels. In FIG. 4a, the system is assumed to start at time 10 m (where "m" represents a millisecond) with an initial value of 97 volts, which is three volts below a set value of 100 volts. As illustrated, the plot shows a steady-state oscillatory behavior, with excursions from about 97.5 to 103.8 volts. As mentioned, such excursions or perturbations about the desired direct value of 100 volts may undesirably couple into the signals being processed. The vertical lines which appear in the plot of FIG. 4a represent transients or ringing due to transistor switching. FIG. 4b illustrates a plurality of plots designated s1–s16, which illustrate the logic state of the various current sources in response to control by the control system of FIG. 2, with a high level representing shunt ON and a logic low level representing shunt OFF. Thus, FIG. 4b gives the output states of the shift register with a logic "1" indicating shunt ON (solar array current diverted and inactive) and a logic "0" indicating shunt OFF (array current transmitted and active). The simulation starts at a load and insolation condition such that shunt #1 (s1) through shunt #12 (s12) are ON and shunts s13 through s16 are OFF. At this condition and at time 10 m (millisecond), the bus voltage is about 97 volts. As time goes by, the control loop attempts to bring the bus voltage to the setpoint (100 volts) by turning OFF shunts s12, s11, . . . , in sequence. However, because of low insolation and low loop gain, the rising bus voltage does not reach the setpoint, even when all shunts are turned OFF at 10.6 m. The over compensated condition allows the bus to keep drifting up until, at 11.3 m, the loop realizes the existence of overvoltage condition and decides to turn shunts ON sequentially in reverse order. Again, because of the same low insolation and low loop gain, the loop instead creates another over compensated situation with all shunts ON (12.1 m) and a subsequent undervoltage bus at 13 m. the oscillatory condition repeats indefinitely.

SUMMARY OF THE INVENTION

The invention relates, in one aspect, to an arrangement for powering a load by means of a plurality of current sources which are subject to current variations, such as might occur if they were all powered from the same source. An integrating filter is coupled to the load, for integrating current applied to the filter to generate a load voltage. A coupling arrangement is coupled to the current sources and to the filter, for coupling to the filter at least those of the current sources which produce current. A switching arrangement is coupled to the plurality of current sources, for individually enabling and disabling the current sources under the control of switch control signals. A controllable source of clock signals is provided, for generating clock signals at a rate or frequency controlled by a clock rate control signal. A feedback control arrangement is coupled to an output port of the integrating filter, to the switching arrangement, and to the controllable source of clock signals, for enabling and disabling various ones of the current sources at a rate established by the clock signals, in a manner which defines a feedback loop for controlling the voltage across the load, whereby the variations in the current of the current sources may adversely affect the stability of the feedback loop and thereby tend to perturb the voltage across the load. A clock rate control arrangement is coupled to the controllable source of clock signals, for generating the clock rate control signals in a manner which tends to stabilize the feedback loop.

In a particular embodiment of the invention, the clock rate control arrangement includes a sensor for sensing the current of at least one of the current sources, and for generating the clock rate control signals in response to the current. In one version of this embodiment, the rate of the clock signals tends to increase in response to diminution of the source current, and tends to decrease in response to increase of the source current. The clock rate control arrangement may include an alternating signal sensor coupled to the output port of the filter, for sensing a signal (preferably a voltage) having a rate of change or slope for sensing an alternating signal, and for producing the clock rate control signals in response to the rate of change of the voltage andor of the alternating signal. A high-pass or bandpass filter is coupled to the load, and has its output port coupled to the alternating signal sensor, for coupling to its output port only an alternating component of the voltage across the load.

In another embodiment of the invention, the alternating signal sensor includes a frequency sensor. The alternating signal sensor produces the clock rate control signals in such a manner that the clock rate tends to decrease in response to increases in the frequency of the alternating component, and to increase in response to decreases in the frequency of the alternating component.

A spacecraft according to another aspect of the invention includes a payload which consumes electrical power when in use; A solar power generator, such as a solar panel array, produces electrical power in response to insolation. A switching arrangement is coupled with the solar power generator and the payload, for controllably coupling the solar power generator with the payload, so that when the switching arrangement assumes a first state, the electrical power flows toward the payload, and when the switching arrangement assumes a second state, the electrical power is blocked from flowing to the payload. A controllable clock signal generator generates a clock signal, and is responsive to a clock control signal for generating the clock signal at one of at least first and second different rates. The clock signal generator may be continuously variable or step-variable. A control arrangement is coupled to the switching arrangement, to the payload, and to the clock signal generator, for controlling the state of the switching arrangement at the current (present) rate or frequency of the clock signal, to thereby form a feedback loop which controls the electrical power flowing toward the payload in a manner which tends to maintain a predetermined value of an electrical characteristic, preferably the voltage, at the payload. In such an arrangement, the feedback loop may take on or assume an unstable condition, in which it may not maintain the predetermined value of the electrical characteristic at the load in the presence or face of changes in the amount of insolation. An electrical characteristic sensor is coupled to the controllable clock signal generator and to (a) at least one part of the solar power generator and (b) the payload, for sensing an electrical characteristic of (a) the one of the solar power generator and (b) the payload, and for generating the clock control signal in a manner which selects among the clock rates in a manner which tends to stabilize the unstable condition.

In a particular version of this aspect of the invention, the switching arrangement is coupled in electrical parallel with the solar power generator, so that solar power generation tends to be shorted when the switching arrangement is conductive, thereby decoupling the solar power generator from the payload. The electrical characteristic sensor comprises a current sensor coupled to the solar power generator for sensing current produced by the solar power generator, for generating the clock control signal.

In another version of this aspect of the invention, the electrical characteristic sensor includes a voltage sensor coupled for sensing an electrical characteristic of electrical power to the payload. The electrical characteristic sensor may comprise an alternating sensor for sensing a characteristic, such as voltage, of an alternating component of the characteristic associated with the load. Preferably, the sensor senses the voltage across the payload. In another version, the sensor senses the frequency of the voltage across the payload.

DESCRIPTION OF THE INVENTION

Figure 5A:
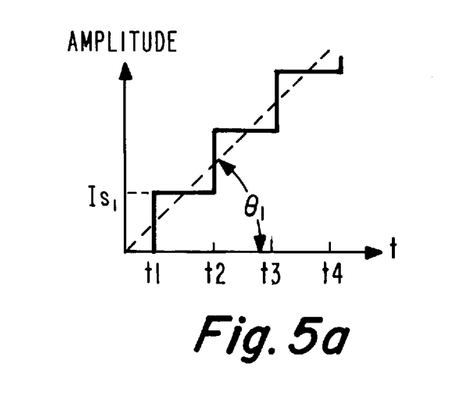
FIGS. 5a, 5b, and 5c illustrate the current injection onto the bus during successive clock cycles as a result of low, mid, and high insolation conditions.
Figure 5B:
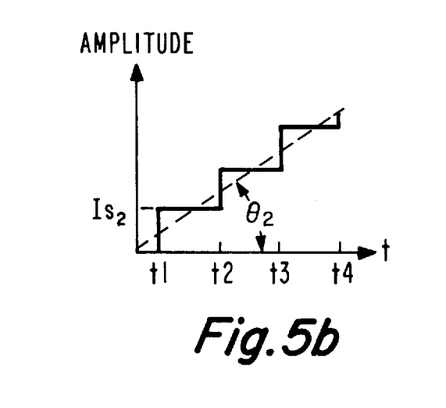
Figure 5C:
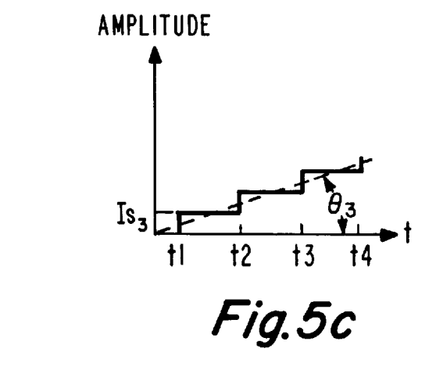

Analysis suggests that a reason for the instability shown in FIG. 4a by the arrangement of FIG. 2 is that the gain of the control loop changes in response to changes in current produced by the current sources or solar panels of array 230 of solar panels. The change in current production can occur when the insolation is changed, which may occur, for example, when the spacecraft moves in such a manner that sunlight falls obliquely onto the panel rather than orthogonally, or it may occur due to naturally-occurring changes in solar flux. The change in gain may be explained by reference to FIGS. 5a, 5b, and 5c, which illustrate the current injection onto the bus 212 of FIG. 2 during successive equal-duration clock cycles under high, mid, and low insolation conditions. Equal-duration clock cycles implies that the clock rate is constant. The plot of FIG. 5a represents the current injection onto the bus when each solar panel produces a relatively large current $Is_1$. As illustrated in FIG. 5a, the amplitude of the current $Is_1$ is zero at times preceding time t1. At time t1, a first solar panel is switched ON or coupled to the bus, as a result of which a current of $Is_1$ flows onto the bus. At the next clock cycle occurring at time t2, another solar panel is switched ON, as a result of which the current flowing onto the bus is $2Is_1$. As each solar panel 230 is brought on-line by the control system at times t3 and t4, the current supplied to the filter 216 increases by $Is_1$. A dash line represents the average current, which increases with unit time, with a slope $\theta_1$. The plot of FIG. 5b represents the current injection onto the bus when each solar panel produces a moderate current $Is_2$, which is less than current $Is_1$. The average current flow per unit time is illustrated by the sloped dash line with slope $\theta_2$. As illustrated in FIG. 5b, the amplitude of the current is zero at times preceding time t1, as in the case of FIG. 5a. At time t1, a first solar panel is switched ON or coupled to the bus, as a result of which a current of $Is_2$ flows onto the bus. At the next clock cycle, another solar panel is switched ON, as a result of which the current flowing onto the bus is $2Is_2$. As each solar panel 230 is brought on-line by the control system, the current supplied to the filter 216 increases by $Is_2$. It can be seen that $\theta_1$ is greater than $\theta_2$, or that the slope of the dash line of FIG. 5b is less than that of FIG. 5a, meaning that the transfer function magnitude or gain represented by FIG. 5b is less than that of FIG. 5a. This can be understood to represent a lesser loop gain in the control system, because a lesser current magnitude for each control cycle necessarily means less charge transfer per unit time into the filter 216 of FIG. 2. Reference to FIG. 5c, representing a still lower current $Is_3$ attributable to a relatively low value of insolation, shows that the slope $\theta_3$ of the dash-line average current is smaller than either of the others, and represents a still lower gain. These changes in gain due to changes in insolation are believed to affect the stability of the control system of FIG. 2 and to occasionally render it unstable. Those skilled in the art and familiar with Bode plots will readily understand the relationship of gain to stability. When the loop is oscillating, the oscillation occurs at the low-frequency crossover, since the system is conditionally stable.

Figure 6:
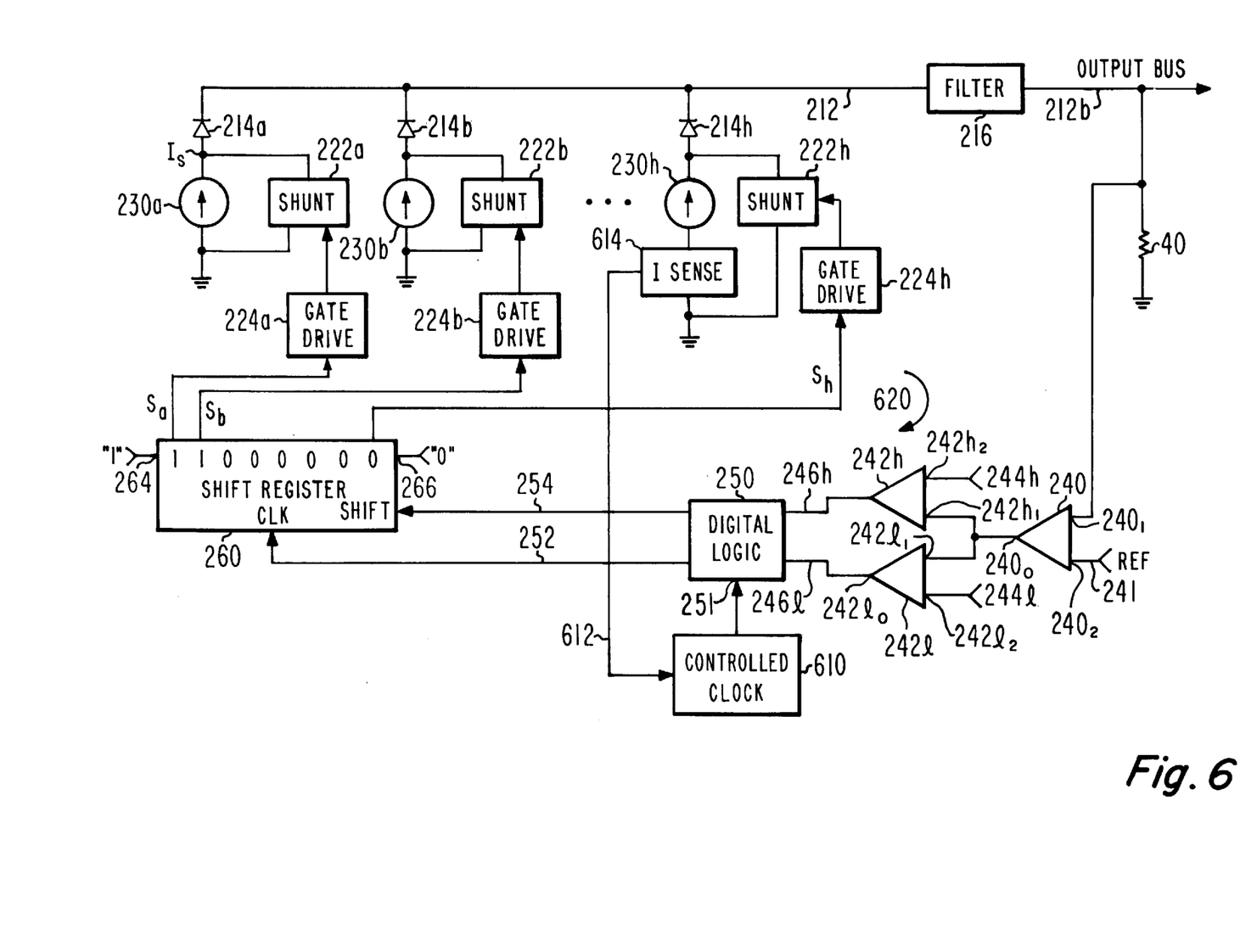
FIG. 6 is a simplified diagram similar to that of FIG. 2, illustrating an arrangement according to an aspect of the invention for maintaining constant rate of current injection to the bus by adjusting the clock rate.

FIG. 6 is a simplified diagram in block and schematic form of an arrangement according to an aspect of the invention. FIG. 6 is similar to FIG. 2, and corresponding elements are designated by like reference numerals. In FIG. 6, the frequency or rate of the clock signal applied to the shift register is made responsive to the current magnitude supplied by the current sources 230. It is clear that the control of the clock rate may be accomplished either manually, or autonomously by a control loop. In the arrangement of FIG. 6, a variable or frequency-controlled clock signal source 610 provides clock signals to a port 251 of a digital logic circuit 250. Source 610 is controlled by a signal applied over a control signal path 612. As illustrated in FIG. 6, the control is derived from a current sensor 614 which senses the current flowing through solar panel 230h, which is assumed to be representative of all of the solar panels. The current flowing in a solar panel may be considered analogous to the rate of change of the bus voltage, because, when a solar panel is coupled to the bus, the integrating function of filter 216 converts the fixed current increment to a voltage ramp. The frequency of the clock is increased as the solar panel current decreases. This has the result of equalizing the gain of voltage control loop 620 of FIG. 6, as illustrated in more detail in FIGS. 7a, 7b, and 7c.

Figure 7A:
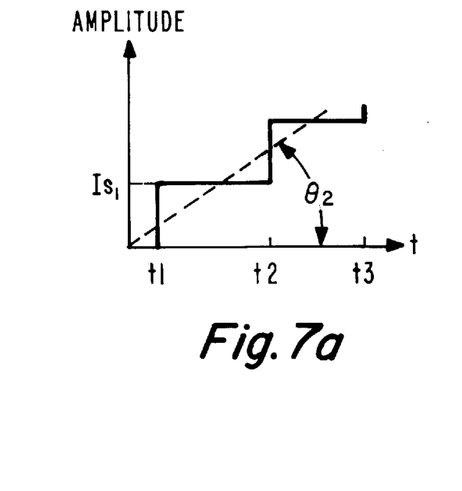
FIGS. 7a, 7b, 7c illustrate how adjustment of the clock rate can result in constant current injection.
Figure 7B:
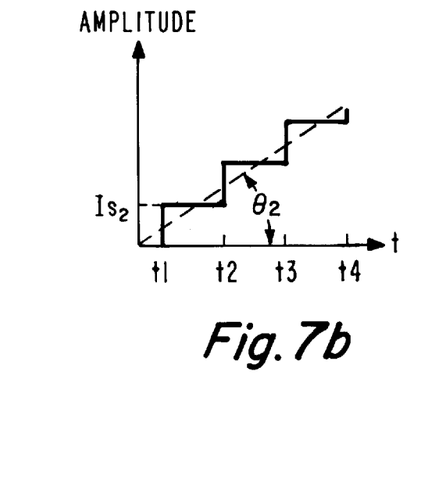
Figure 7C:
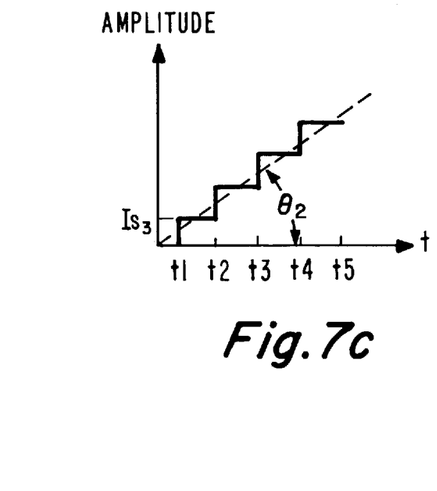

In FIGS. 7a, 7b, and 7c, the solar panel currents $Is_1$, $Is_2$, and $Is_3$ are in the same relationship as the corresponding values in FIGS. 5a, 5b, and 5c, but the clock rates are varied as a function of the present-time (current) value of electrical current Is. More particularly, in FIG. 7a, the solid-line plot representing the cumulative current applied to the bus has relatively large steps of current $Is_1$, but the steps are relatively far apart, indicating that the clock rate is at its lowest value. The dash-line average-current plot in FIG. 7a has a slope $\theta_2$. In FIG. 7b, the solid-line plot representing the cumulative current applied to the bus has medium-size steps $Is_2$, but the steps are closer together, indicating that the clock rate or frequency is at a value greater than its lowest value. The dash-line average-current plot in FIG. 7b has a slope $\theta_2$, the same as that of FIG. 7a. Similarly, in FIG. 7c, the solid-line plot representing the cumulative current applied to the bus has small-amplitude steps $Is_3$, but the steps are closer together, indicating that the clock rate or frequency is at its greatest value. The dash-line average-current plot in FIG. 7c has a slope $\theta_2$, the same as that of FIGS. 7a and 7b. Since the slopes are the same, the gain of this portion of the voltage control loop remains constant regardless of the insolation or the spacecraft attitude.

Figure 8:
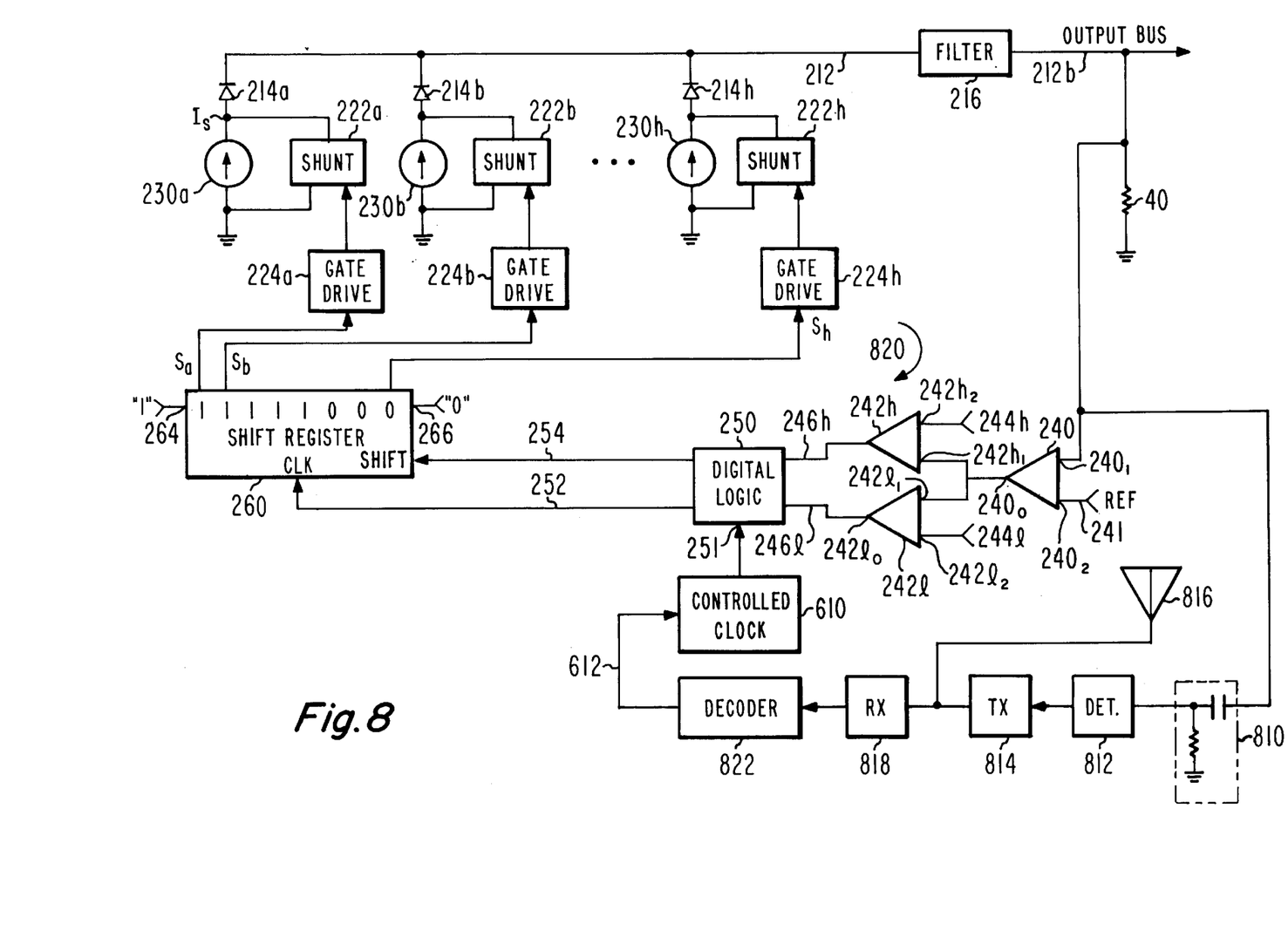
FIG. 8 is a simplified diagram in block and schematic form, illustrating remote control of the controlled clock.

As mentioned above, the control of clock signal source 610 of FIG. 6 may be performed manually. Since the spacecraft is generally not accessible for direct manipulation, the frequency of the clock signal can be remotely controlled, as illustrated in FIG. 8, by an antenna 816, receiver 818 and decoder 822. In such an arrangement, the ground controller transmits encoded control signals to the spacecraft, which are received by antenna 816 and receiver (RX) 818, and decoded by decoder 822, for producing a control signal which is applied over signal path 612. Of course, the operator would have to be aware of the existence of instability in the voltage control loop 820, which could be provided by an alternating-current detector 812 coupled to the bus 212b by way of a direct-voltage blocking circuit 810, with the information as to the frequency and/or magnitude of alternating voltage components on the bus being transmitted by a transmitter (TX) 814 and antenna 816 to the operator at the ground station.

Figure 9:
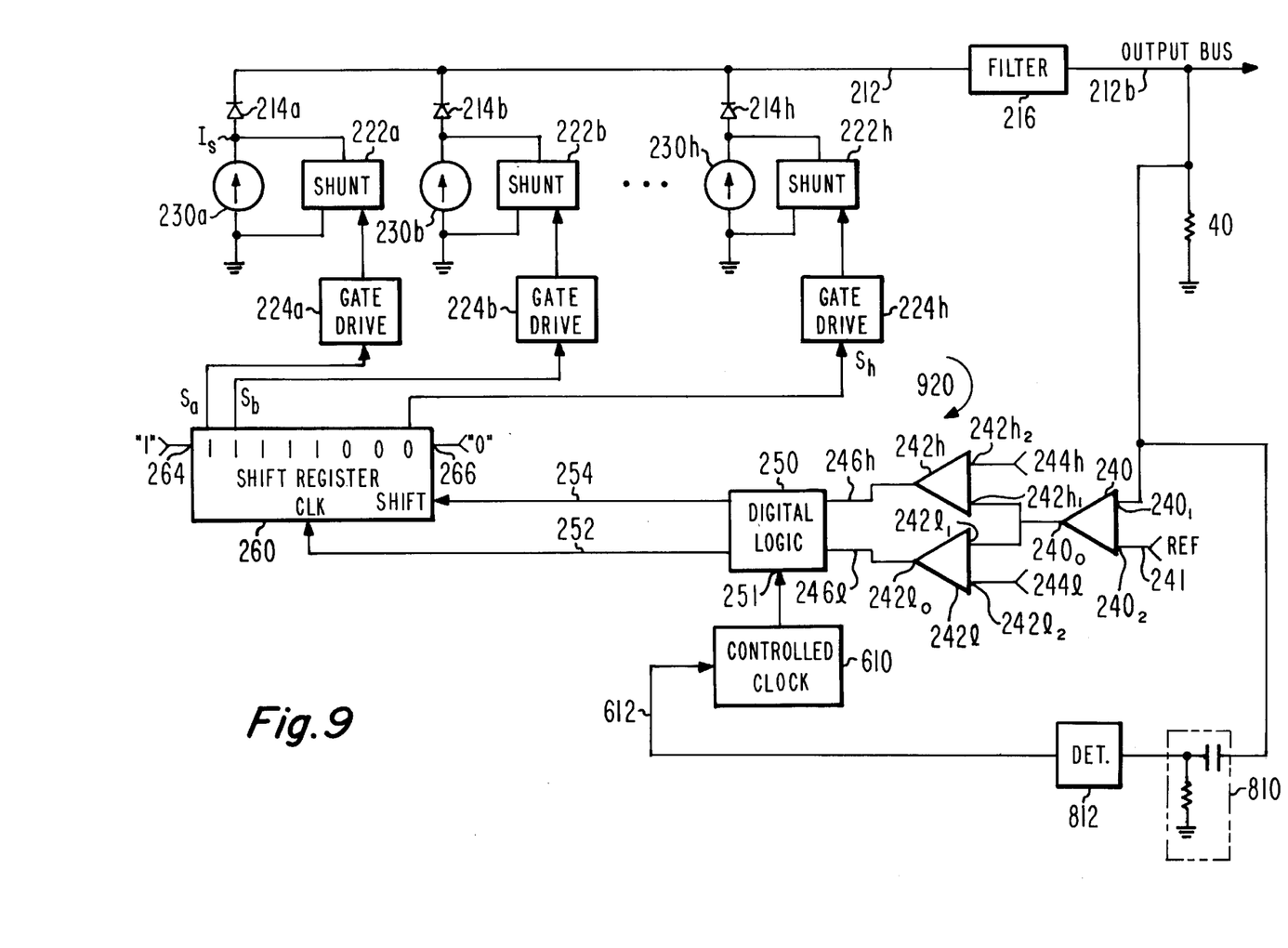
FIG. 9 is a simplified diagram in block and schematic form, of an embodiment of the invention similar to FIG. 6, in which the presence of voltage oscillations on the bus controls the clock rate.

FIG. 9 is similar to FIG. 6, but uses yet another control scheme to establish the frequency of the clock signal which is applied to the shift register. In the arrangement of FIG. 9, an alternating-current or rate-of-change sensor, which may include a direct-voltage blocking circuit 810 having a series capacitor and shunt resistor, together with an alternating-voltage detector 812, is used as in FIG. 8 to give an indication of the voltage perturbations on the bus 212. The loop gain of the voltage control loop 920 is initially set for stability at either the maximum expected current $Is_1$ or at the minimum expected current $Is_2$. Any instability in voltage control loop 920, then, must be caused by too low a gain in the first case, since the current presumably cannot exceed that attributable to maximum insolation. Similarly, any instability of the voltage control loop 920 must be caused by too high a gain in the second case. No separate controller is required, except possibly a comparator for comparing with a threshold representing significance, or possibly a polarity inverter, since the presence of a signal on control path 612 is indicative of one or the other of too low a gain or too high a gain. The control direction is selected to increase the gain by increasing the controllable clock frequency in the first case, or decreases the gain by decreasing the clock frequency in the second case. In this arrangement, the presence of perturbations on the bus leads directly to a single control action, and no iterative control is necessary.

Figure 10A:
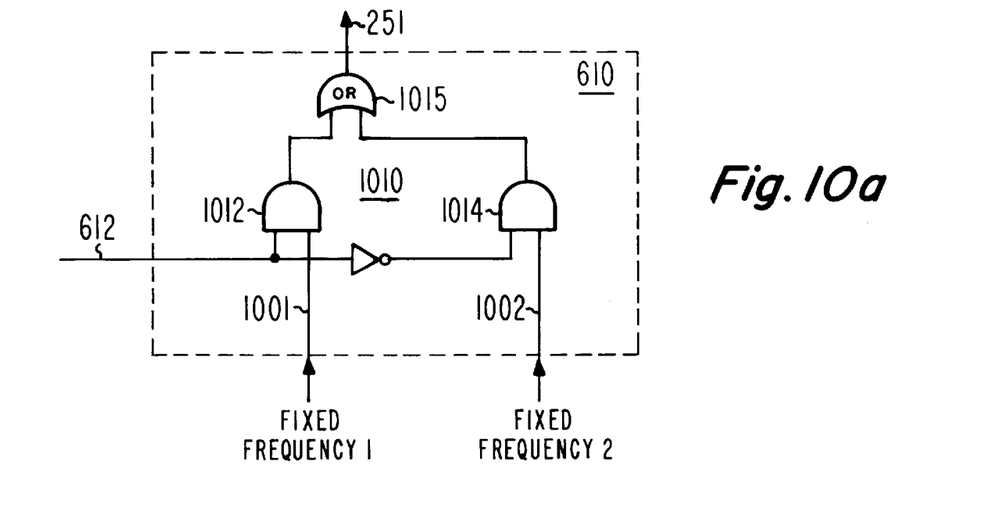
FIGS. 10a and 10b are logic diagrams illustrating how the clock frequency can be controlled.

As so far described, the clock rate has simply been indicated as being controlled, without any indication of how it might be controlled. Variable-frequency clock signal generators are notoriously well known in the art, and it is believed that any person skilled in the art will be able to implement such an arrangement. The clock frequency may be continuously variable in response to the control signal applied to signal path 612, or it may be stepwise. In a preferred embodiment of the invention, the clock signal generator simply switches among a few fixed clock frequencies. As illustrated in FIG. 10a, clock signal generator 610 includes a combinatorial logic circuit 1010 which receives two fixed clock signals over signal paths 1001 and 1002, and selects one or the other in dependence upon the state of a binary signal applied over signal path 612. Logic circuit 1010 includes AND gate 1012, which receives a single-bit control signal at one input port, and the first clock signal from path 1001 at its second input port. Logic circuit 1012 receives inverted control signal at its first input port, and the second clock signal at its second input port. One or the other of AND gates 1012 or 1014 will be enabled to pass its clock signal regardless of the state of the control signal on signal path 612, and a further OR gate 1015 passes the selected clock signal.

Figure 10B:
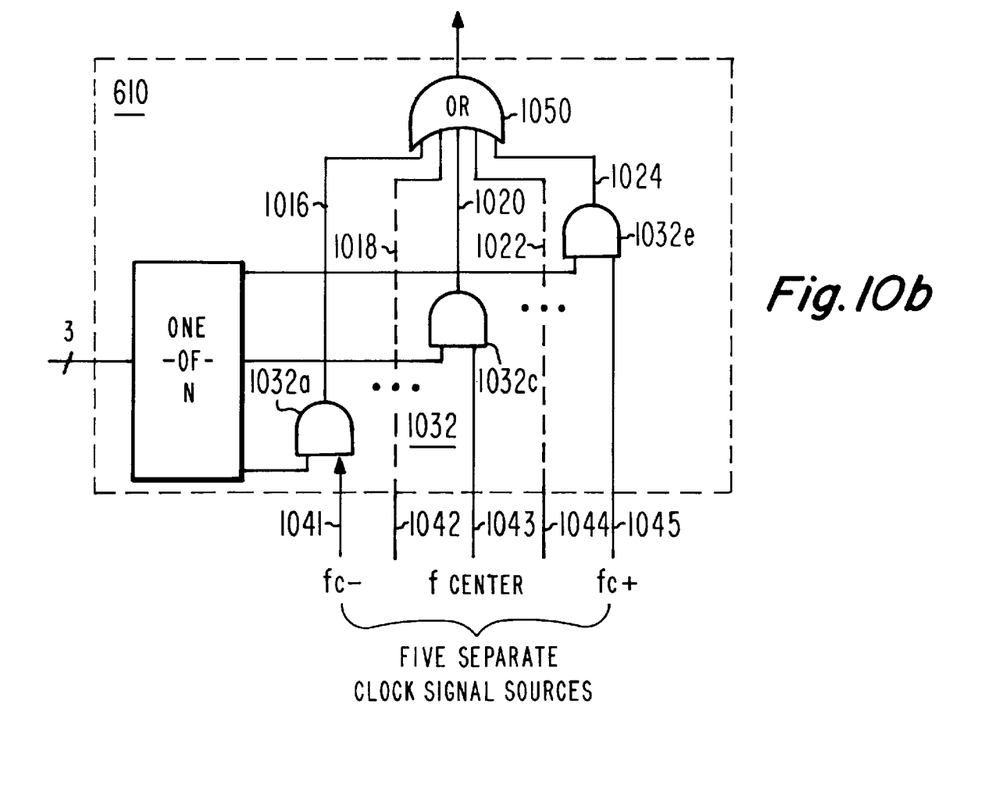

The arrangement of FIG. 10*b* illustrates the use of five fixed clock frequencies applied over signal paths 1041, 1042, 1043, 1044, and 1045, with a logic circuit consisting of AND gates designated generally as 1032 driven by signal decoded from signal path 612 by one-of-n decoder 1030. The selected one of the clock signals is passed by an OR gate 1050. In such an arrangement, the center clock frequency may be 20 KHz., and the other clock frequencies may differ therefrom by ±10% or ±2 KHz. The clock signals would then be 16, 18, 20, 22, and 24 KHz., and five different gain values would be available in the voltage control loop.

Figure 11A:
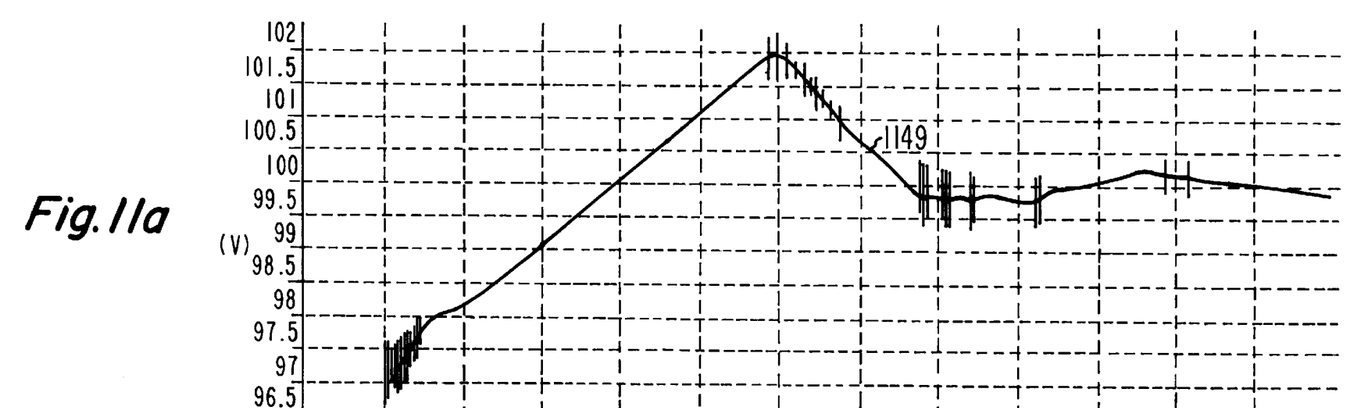
FIGS. 11a and 11b are plots of bus voltage and shunt control similar to FIGS. 4a and 4b, for an embodiment in which an altered clock rate stabilizes the voltage.
Figure 11B:
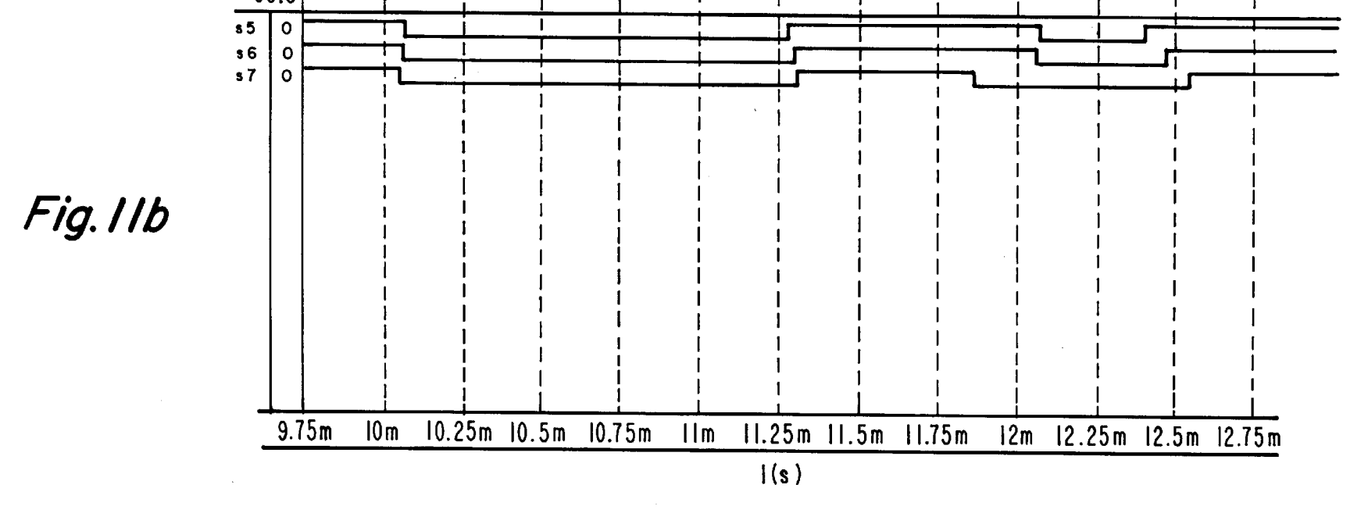

FIGURE 11*a* is a plot 1149 of bus voltage of the system of FIG. 2, and the plots s5, s6, and s7 of FIG. 11*b* represent the solar panel ON (logic low) and OFF (logic high) states beginning at the time 10 m. Unlike the situation represented by the plot 410 of FIG. 4*a*, plot 1149 of FIG. 11*a* represents a bus voltage which stabilizes after the introduction of a higher clock rate.

Thus, the invention relates, in one aspect, to an arrangement for powering a load (40) by means of a plurality of sources according to an aspect of the invention comprises a plurality of current sources (230*a*, 230*b*, . . . , 230*h*) which are subject to current variations, such as might occur if they were all powered from the same source. An integrating filter (216) is coupled to the load (40), for integrating current applied to the filter (216) to generate a load voltage (V). A coupling arrangement (214*a*, 214*b*, . . . , 214*h*) is coupled to the current sources (230*a*, 230*b*, . . . , 230*h*) and to the filter (216), for coupling to the filter (216) at least those of the current sources (230*a*, 230*b*, . . . , 230*h*) which produce current. A switching arrangement (222, 224) is coupled to the plurality of current sources (230*a*, 230*b*, . . . , 230*h*), for individually enabling and disabling the current sources (230*a*, 230*b*, . . . , 230*h*) under the control of switch control signals (s). A controllable source of clock signals (610) is provided, for generating clock signals at a rate or frequency controlled by a clock rate control signal. A feedback control arrangement (240, 242, 250,260) is coupled to an output port of the integrating filter (216), to the switching arrangement (222, 224), and to the controllable source of clock signals (610), for enabling and disabling various ones of the current sources (230*a*, 230*b*, . . . , 230*h*) at a rate established by the clock signals, in a manner which defines a feedback loop (220) for controlling the voltage across the load (40), whereby the variations in the current of the current sources (230*a*, 230*b*, . . . , 230*h*) may adversely affect the stability of the feedback loop (220) and thereby tend to perturb the voltage (V) across the load (40). A clock rate control arrangement (612,614; 810, 812) is coupled to the controllable source of clock signals (610), for generating the clock rate control signals in a manner which tends to stabilize the feedback loop (220).

In a particular embodiment of the invention, the clock rate control arrangement (612,614; 810, 812) includes a sensor (614) for sensing the current of at least one of the current sources (230*a*, 230*b*, . . . , 230*h*), and for generating the clock rate control signals in response to the current. In one version of this embodiment, the rate of the clock signals tends to increase in response to diminution of the source current, and tends to decrease in response to increase of the source current. The clock rate control arrangement (612, 614; 810, 812) may include an alternating signal sensor (614) coupled to the output port of the filter (216), for sensing a signal (preferably a voltage) having a rate of change (slope) or for sensing an alternating signal (as opposed to a direct signal), and for producing the clock rate control signals in response to the rate of change of the voltage and or of the alternating signal. A highpass or bandpass filter (216) is coupled to the load (40), and has its output port coupled to the alternating signal sensor (614), for coupling to its output port only an alternating component of the voltage across the load. It should be noted that a highpass filter includes a high-pass section, in that it blocks passage of direct components of the signal.

In another embodiment of the invention, the alternating signal sensor (614) includes a frequency sensor (814). The alternating signal sensor (614) produces the clock rate control signals in such a manner that the clock rate tends to decrease in response to increases in the frequency of the alternating component, and to increase in response to decreases in the frequency of the alternating component.

A spacecraft according to another aspect of the invention includes a payload (40) which consumes electrical power when in use; A solar power generator (230*a*, 230*b*, . . . , 230*h*), such as a solar panel array, produces electrical power in response to insolation. A switching arrangement (214, 222, 224) is coupled with the solar power generator (230*a*, 230*b*, . . . , 230*h*) and the payload, for controllably coupling the solar power generator (230*a*, 230*b*, . . . , 230*h*) with the payload, so that when the switching arrangement (214, 222, 224) assumes a first state, the electrical power flows toward the payload (40), and when the switching arrangement (214, 222, 224) assumes a second state, the electrical power is blocked from flowing to the payload. A controllable clock signal generator (610) generates a clock signal, and is responsive to a clock control signal for generating the clock signal at one of at least first and second different rates. The clock signal generator may be continuously variable or step-variable. A control arrangement (240, 242, 250, 260) is coupled to the switching arrangement (222, 224), to the payload (40), and to the clock signal generator (610), for controlling the state of the switching arrangement (222, 224) at the current rate or frequency of the clock signal, to thereby form a feedback loop (220) which controls the electrical power flowing toward the payload in a manner which tends to maintain a predetermined value of an electrical characteristic, preferably the voltage, at the payload. In such an arrangement, the feedback loop (220) may take on or assume an unstable condition, in which it may not maintain the predetermined value of the electrical characteristic at the load in the presence or face of changes in the amount of insolation. An electrical characteristic sensor (614; 812) is coupled to the controllable clock signal generator (610) and to (a) at least one part (230*h*) of the solar power generator (230*a*, 230*b*, . . . , 230*h*) and (b) the payload, for sensing an electrical characteristic of (a) the one of the solar power generator (230*a*, 230*b*, . . . , 230*h*) and (b) the payload, and for generating the clock control signal in a manner which selects among the clock rates in a manner which tends to stabilize the unstable condition.

In a particular version of this aspect of the invention, the switching arrangement (222, 224) is coupled in electrical parallel with the solar power generator (230*a*, 230*b*, . . . , 230*h*), so that solar power generation tends to be shorted when the switching arrangement (222, 224) is conductive, thereby decoupling the solar power generator (230*a*, 230*b*, . . . , 230*h*) from the payload (40). The electrical characteristic sensor (614; 812) comprises a current sensor (614) coupled to the solar power generator (230*a*, 230*b*, . . . , 230*h*) for sensing current produced by the solar power generator (230*a*, 230*b*, 230*h*), for generating the clock control signal.

In another version of this aspect of the invention, the electrical characteristic sensor (614, 810, 812) comprises a voltage sensor (810, 812) coupled for sensing an electrical characteristic of electrical power to the payload. The electrical characteristic sensor (614, 810, 812) may comprise an alternating sensor for sensing a characteristic, such as voltage, of an alternating component of the characteristic associated with the load. Preferably, the sensor senses the voltage across the payload. In another version, the sensor senses the frequency of the voltage across the payload.

Other embodiments of the invention will be apparent to those skilled in the art. For example, while the solar panels as described have their negative ends grounded so as to provide a positive bus voltage, the grounded end may be the positive end, providing a negative bus voltage, so long as corresponding changes are made to the polarities of the control system. While the shunts are illustrated as FETs, they may be bipolar transistors, or other types of switches. While the error amplifier 240 of FIG. 2 is illustrated as directly sensing the voltage of output bus 212b, it may instead sense a sample of the bus voltage by way of a voltage divider. While the current of a single solar panel is sensed in the arrangement of FIG. 6 to generate a control signal for clock 610, an average of all of the solar panel currents may be used. While the system illustrated and described uses a plurality of solar panels or current sources, the principles of the invention apply to a control loop having a single current source of variable magnitude. The frequency sensing and current sensing schemes have been described separately, but both types of sensors may be used in the same controller, for providing control under both stable (non-oscillatory) and unstable (oscillatory) conditions. As mentioned above, a bandpass filter is interchangeable with a highpass filter for the purpose of blocking direct voltage.

What is claimed is:

1. A spacecraft, comprising:

a payload which consumes electrical power when in use;

a solar power generator for producing electrical power in response to insolation;

switch means coupled with said solar power generator and said payload, for controllably coupling said solar power generator with said payload, so that when said switch means assumes a first state, said electrical power flows toward said payload, and when said switch means assumes a second state, said electrical power is blocked from flowing to said payload;

controllable clock signal generating means for generating a clock signal, and responsive to a clock control signal for generating said clock signal at one of at least first and second different rates;

control means coupled to said switch means, to said payload, and to said clock signal generating means, for controlling said state of said switch means at a rate of said clock signal, to thereby form a feedback loop in a manner which controls said electrical power flowing toward said payload in a manner which tends to maintain a predetermined value of an electrical characteristic at said payload, whereby said feedback loop assumes an unstable condition in which it may not maintain said predetermined value in the face of changes in said insolation;

electrical characteristic sensing means coupled to said controllable clock signal generates means and to one of said payload and said solar power generator, for sensing an electrical characteristic of said one of said solar power generator and said payload, and for generating said clock control signal in a manner which selects among said clock rates to improve said unstable condition.

2. A spacecraft according to claim 1, wherein:

said switch means is coupled in electrical parallel with said solar power generator, so that said solar power generation tends to be shorted when said switch means is conductive, thereby decoupling said solar power generator from said payload; and said electrical characteristic sensing means comprises current sensing means coupled to said solar power generator for sensing current produced by said solar power generator, for generating said clock control signal.

3. A spacecraft according to claim 1, wherein said electrical characteristic sensing means comprises means for sensing voltage across said payload.

4. A spacecraft according to claim 3, wherein said electrical characteristic sensing means comprises means for sensing a characteristic of an alternating component of said voltage across said payload.

5. A spacecraft according to claim 4, wherein said electrical characteristic sensing means comprises means for sensing the frequency of said alternating component of said voltage across said payload.

6. An arrangement for powering a load by means of a plurality of sources, said arrangement comprising:

a plurality of current sources (230a, 230b, . . . , 230h) which are subject to current variations;

an integrating filter (216) coupled to said load, for integrating current applied to said filter, to generate a load voltage;

coupling means (214a, 214b, . . . , 214h) coupled to said current sources and to said filter, for coupling at least those of said current sources which produce current to said filter;

switch means (222) coupled to said plurality of current sources (230), for individually enabling and disabling said current sources under the control of switch control signals;

a controllable source of clock signals, for generating clock signals at a rate controlled by a clock rate control signal;

feedback control means coupled to an output port of said integrating filter, to said switch means, and to said controllable source of clock signals, for enabling and disabling various ones of said current sources at a rate established by said clock signals, in a manner which defines a feedback loop for controlling the voltage across said load, whereby said variations in said current of said current sources may adversely affect the stability of said feedback loop and thereby tend to perturb said voltage across said load; and clock rate control means coupled to said controllable source of clock signals, for generating said clock rate control signals in a manner which tends to stabilize said feedback loop.

7. An arrangement according to claim 6, wherein said clock rate control means comprises:

sensing means for sensing the current of at least one of said current sources, and for generating said clock rate control signals in response to said current.

8. An arrangement according to claim 7, wherein said rate of said clock signals tends to increase in response to diminution of said current, and tends to decrease in response to increase of said current.

9. An arrangement according to claim 6, wherein said clock rate control means comprises:
- alternating signal sensing means coupled to said output port of said high-pass filter, for sensing an alternating signal, and for producing said clock rate control signals in response to said alternating signal; and
- a high-pass filter coupled to said load and to said alternating signal sensing means, for coupling to an output port only an alternating component of said voltage across said load.

10. An arrangement according to claim 9, wherein said alternating signal sensing means comprises frequency sensing means.

11. An arrangement according to claim 10, wherein said alternating signal sensing means produces said clock rate control signals in such a manner that said clock rate tends to decrease in response to increases in said frequency of said alternating component, and to increase in response to decreases in said frequency of said alternating component.

* * * * *